(12) United States Patent
Villeneuve et al.

(10) Patent No.: US 8,506,275 B2
(45) Date of Patent: Aug. 13, 2013

(54) REMOVABLE DEVICE FOR MOULDING A FLEXIBLE WALL IN THE GROOVE OF A TIRE PATTERN

(75) Inventors: Bernard Villeneuve, Saint Amant Tallende (FR); Christian Gomet, Clermont-Ferrand (FR)

(73) Assignees: Compagnie Generale des Etablissements, Clermont-Ferrand (FR); Michelin Recherche et Technique S.A., Granges-Paccot (CH)

(*) Notice: Subject to any disclaimer, the term of this patent is extended or adjusted under 35 U.S.C. 154(b) by 0 days.

(21) Appl. No.: 13/376,705

(22) PCT Filed: Jun. 21, 2010

(86) PCT No.: PCT/EP2010/058697
§ 371 (c)(1),
(2), (4) Date: Jan. 18, 2012

(87) PCT Pub. No.: WO2010/146180
PCT Pub. Date: Dec. 23, 2010

(65) Prior Publication Data
US 2012/0114777 A1 May 10, 2012

(30) Foreign Application Priority Data
Jun. 19, 2009 (FR) .................................. 09 02999

(51) Int. Cl.
*B29C 33/10* (2006.01)
*B29C 33/42* (2006.01)

(52) U.S. Cl.
USPC ............................. 425/28.1; 425/46; 425/812

(58) Field of Classification Search
USPC ..................... 425/28.1, 35, 46, 812
See application file for complete search history.

(56) References Cited

U.S. PATENT DOCUMENTS

| 3,067,506 A | 12/1962 | Grant et al. |
| 4,708,609 A * | 11/1987 | Yoda et al. .................. 425/28.1 |
| 5,066,209 A * | 11/1991 | Schmaderer et al. ......... 425/28.1 |

(Continued)

FOREIGN PATENT DOCUMENTS

| DE | 199 14 215 A1 | 10/2000 |
| EP | 0 722 816 A1 | 7/1996 |

(Continued)

OTHER PUBLICATIONS

International Search Report (PCT/ISA/210) issued on Aug. 25, 2010, by European Patent Office as the International Searching Authority for International Application No. PCT/EP2010/058697.

(Continued)

*Primary Examiner* — James Mackey
(74) *Attorney, Agent, or Firm* — Buchanan Ingersoll & Rooney PC

(57) ABSTRACT

The invention relates to a tire curing mold comprising at least one lining element for molding the tread of said tire, said lining element comprising at least one bead for molding a groove in the tread. The curing mold comprises at least one insert forming a portion of the bead, said insert partially or completely delimiting a slot extending into the depth of the bead. The slot is oriented substantially perpendicularly to the bead. The slot is configured in order to mold a flexible wall of reduced thickness made as one piece with at least one wall of the groove molded by the bead.

10 Claims, 4 Drawing Sheets

(56) References Cited

U.S. PATENT DOCUMENTS

| | | |
|---|---|---|
| 5,261,804 A | 11/1993 | Jachowsky |
| 5,800,642 A | 9/1998 | Ohya |
| 5,843,326 A | 12/1998 | Bellot |
| 6,138,982 A | 10/2000 | Bellot |
| 6,143,223 A | 11/2000 | Lopez |
| 6,454,554 B1 | 9/2002 | Lopez et al. |

FOREIGN PATENT DOCUMENTS

| | | |
|---|---|---|
| EP | 0 753 419 A2 | 1/1997 |
| EP | 0 908 330 A1 | 4/1999 |
| EP | 0 925 907 A1 | 6/1999 |
| EP | 1 050 397 A1 | 11/2000 |
| FR | 2 715 891 A1 | 8/1995 |
| GB | 450723 | 7/1934 |
| JP | 8-72061 A | 3/1996 |
| JP | 2000-102925 A | 4/2000 |
| JP | 2000-343916 A | 12/2000 |
| JP | 2007-210569 A | 8/2007 |

OTHER PUBLICATIONS

French Search Report dated Feb. 12, 2010.

\* cited by examiner

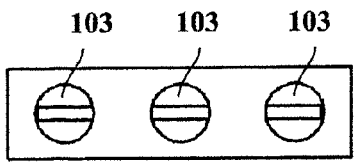
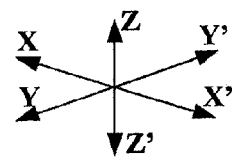
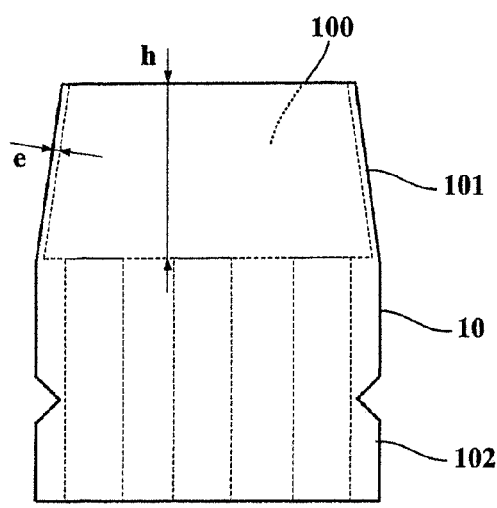
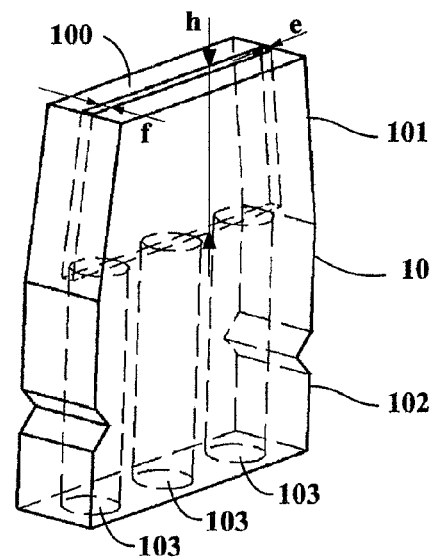
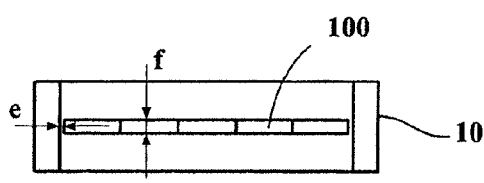

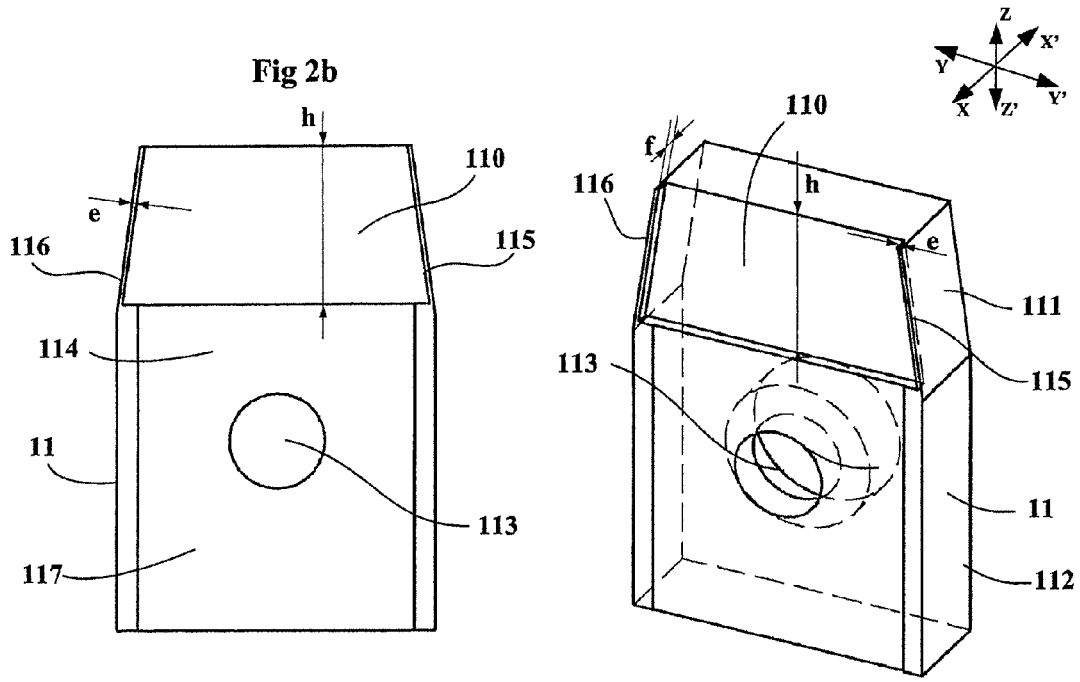
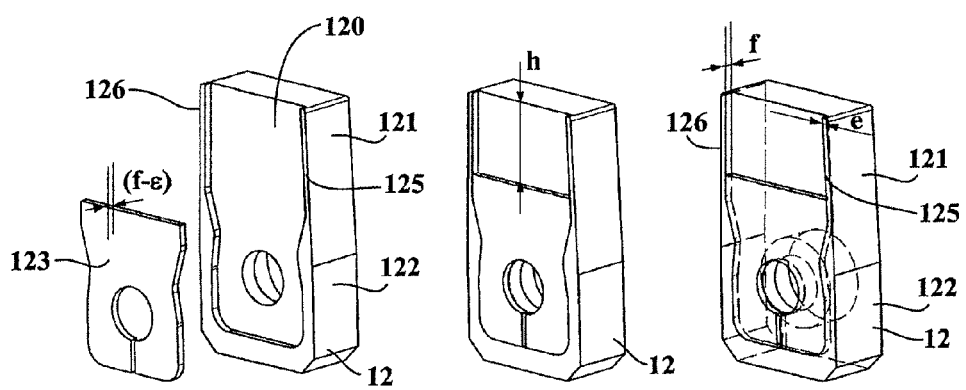

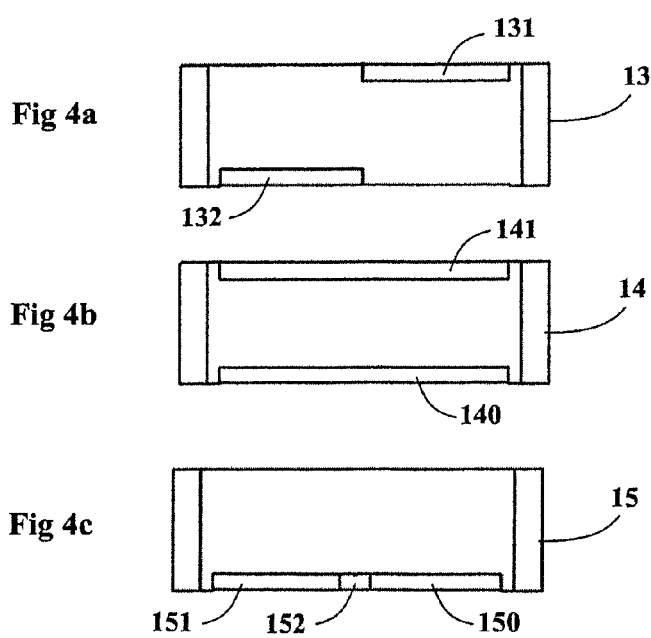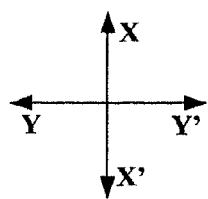

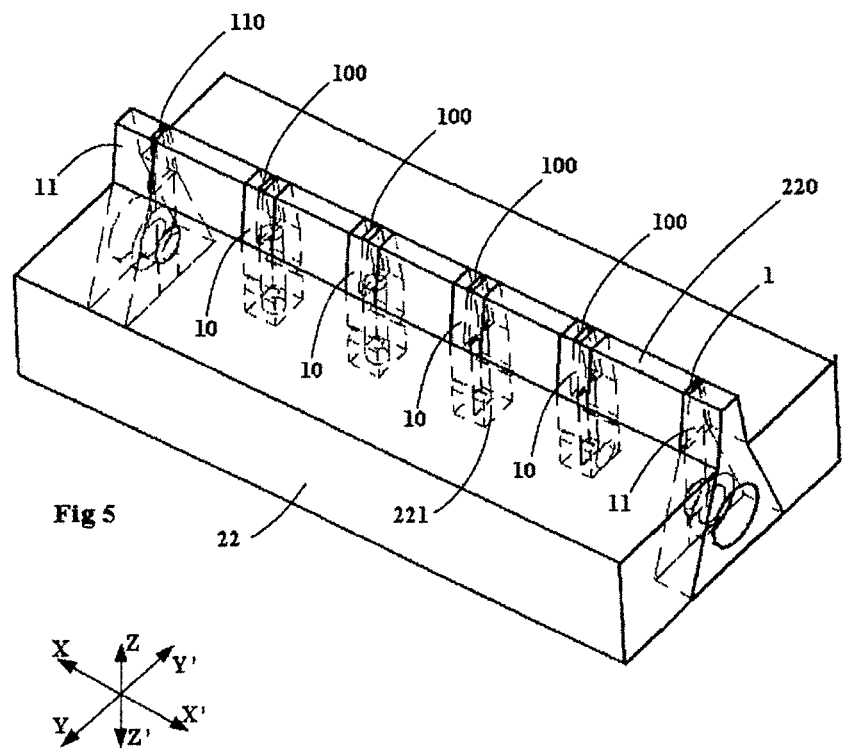
Fig 5
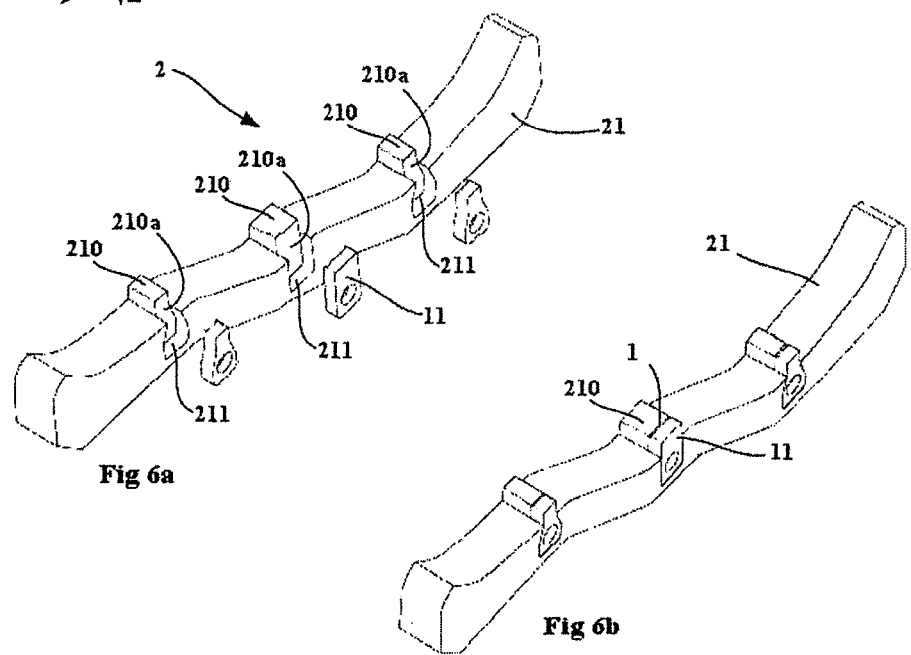
Fig 6a
Fig 6b

REMOVABLE DEVICE FOR MOULDING A FLEXIBLE WALL IN THE GROOVE OF A TIRE PATTERN

FIELD OF THE INVENTION

The invention relates to the field of the manufacture of tires, in particular the manufacture of molds used for vulcanization.

More particularly, the invention relates to the molding of flexible walls positioned in a groove of a tire pattern.

PRIOR ART

The purpose of the grooves of the pattern is to drain and discharge water, when the tire travels on wet or waterlogged ground. These grooves are the cause of some of the rolling noise phenomena, in that they form pressurized air accumulation regions that generate sound waves. The grooves are positioned in the circumferential direction and in the axial direction, and the position, size and number thereof are the subject of detailed studies on the part of tire pattern designers.

For the purpose of reducing the rolling noise level of tires, while preserving the water drainage qualities, it is known from the prior art to position flexible walls of reduced thickness in a direction transverse to the direction of the grooves. These walls, also known as flaps, have the distinctive feature, like a door, of extending transversely from one of the walls of the groove and of remaining in a closed position when the tire is rolling on dry ground in order to block the diffusion of sound waves, and of being able to open when the tire is rolling on wet ground in order to enable water penetrating into the drainage groove to be discharged.

Publications FR 2 715 891, GB 450 723 or else EP 908 330 describe different embodiments of these flexible walls.

It will be seen that the most common embodiments relate to flexible walls that extend from the wall of the bottom of the groove, due to the absence of undercuts that oppose the demolding of the tire, at the end of the vulcanization step. The flexible wall has one or more radial cuts, allowing said wall to pivot about a point of attachment with the groove when the flexible wall moves from an open position to a closed position. The thickness of the flexible walls varies between 0.2 mm and 1 mm. The width of the cuts may be adjusted as required as a function of the particular shape that it is desired to give to the lateral edges of the flexible wall.

In practice, the molds designed for molding tires that have these devices comprise substantially radial slots made in beads designed for molding the drainage grooves, said slots extending transversely relative to the direction of said beads.

However, the production of these slots, with the required degree of precision, is accompanied by a large number of difficulties, in particular when use is made of techniques for producing molds by casting molten material in a lost mold cavity, generally made of plaster, and in which the fineness of the elements renders the latter excessively fragile, or even worse, when the finished mold is operated on directly, due to the considerable bulkiness of the tools when it is desired to access the pattern elements.

The objective of the invention is to propose a solution that makes it possible to overcome the problems raised above.

BRIEF DESCRIPTION OF THE INVENTION

The mold according to the invention comprises lining elements that are positioned circumferentially and that are intended to form the cavity of the tread of said tire, said lining elements comprising beads intended to form the cavity of the grooves of the pattern, is characterized in that one or more inserts, comprising a body firmly attached to the lining and a head, comprising a slot intended to contribute to the molding of a flexible wall of reduced thickness articulated to at least one of the walls of the groove, preferably to the wall of the bottom of the groove. The inserts are positioned in at least one of said beads so that the slot is placed substantially perpendicularly to the longitudinal direction of the groove.

In this manner, it is possible to produce said inserts in a separate manufacturing phase, using suitable means, without having to suffer the drawbacks mentioned above.

According to another aspect of the invention, said inserts may be implanted in a fixed manner in the bead, or be removable so that it is possible to withdraw them from the mold. This embodiment proves particularly advantageous in that it makes it possible to do away with materials capable of encumbering the volume intended for the molding of said flexible walls.

BRIEF DESCRIPTION OF THE DRAWINGS

Other features and advantages of the invention will emerge from the following description, given by way of example and non-limiting, with regard to the appended drawings in which:

FIG. 1a, FIG. 1b, FIG. 1c and FIG. 1d schematically represent a perspective view, a front view, a bottom view and a top view of an insert according to a first embodiment, FIG. 2a, FIG. 2b and FIG. 2c schematically represent a perspective view, a front view and a top view of an insert according to a second embodiment, FIG. 3a, FIG. 3b and FIG. 3c schematically represent various perspective views of an insert according to a third embodiment, FIG. 4a, FIG. 4b and FIG. 4c schematically represent top views of other embodiments of the insert, FIG. 5 schematically represents a perspective view of a lining element comprising inserts according to the first embodiment and the second embodiment, and FIG. 6a and FIG. 6b present the mounting of inserts according to the second embodiment or the third embodiment in a lining element.

In the remainder of the description, the direction XX' corresponds to a circumferential direction of the mold, the direction YY' corresponds to a transverse direction of the mold perpendicular to the circumferential direction and the direction ZZ' corresponds to a radial direction of the mold perpendicular to the circumferential direction and to the transverse direction.

According to a first embodiment, the insert 10 illustrated in FIG. 1 comprises a head 101 and a body 102. The head of the insert is intended to be inserted into a molding bead (not represented). The role of the body is to anchor the head 101 in a lining element.

The head of the insert comprises a slot 100 intended to mold a flexible wall. The slot has here a width f. The width f corresponds to the thickness of the flexible wall, and may be between 0.2 mm and 1 mm.

The slot 100 extends into the depth of the head of the insert over a height h and opens onto an upper surface of the head of the insert forming an opening.

The outer shape of the two opposite walls of the head, which are substantially perpendicular to the transverse direction YY', and also that of the wall of the head perpendicular to the direction ZZ', on which the slot 100 opens, is suitable for forming a continuous surface with the outer surface of the bead, so as to ensure the molding of the groove of the tire.

Thus, the two opposite side walls in the transverse direction are intended to mold the edges of the groove, and the wall of the head on which the slot opens is intended to mold the bottom of the groove to which the flexible wall is articulated.

The slot 100 does not open onto the opposite outer side walls in the transverse direction of the head of the insert. The transverse side walls of the slot are separated from the outer transverse walls of the head of the insert by a partition of thickness e. In this way, the flexible wall has no connection with the side walls of the groove. The thickness e of said partition, as represented, may usefully be between 0.1 mm and 0.2 mm.

This partition may also have a variable width, as has already been mentioned above, when it is desired to give a particular profile to the lateral edges of the flexible wall.

The body 102 of the insert 10 has a shape suitable for being inserted into a housing 221 provided for this purpose in the body of the lining element as is illustrated in FIG. 5.

The portion of the molding lining element 2 comprises a base 22 and a bead 220.

The base 22 is suitable for molding the running surface of a tire tread.

The bead 220 protrudes from the base 22 and is suitable for molding a groove in the tread.

The bead 220 mainly extends here in the circumferential direction XX'.

In one embodiment variant, the bead 220 extends mainly in the transverse direction YY'.

The inserts 10 are positioned in the housing 221, so that the slot 100 is oriented in a direction substantially perpendicular to the bead 220. Thus, if the bead extends mainly in the circumferential direction XX' in order to form a circumferential groove, the slot is oriented along the transverse direction YY'. As a variant, if the bead extends mainly in the transverse direction YY' in order to form a transverse groove, the slot is oriented in the circumferential direction XX'.

The shape of the head of the insert is adjusted here in order to form a continuous surface with the outer surface of the bead.

The inserts may be produced during machining operations separate from the mold finishing step, thus making it possible to control the geometry of the notch. Once placed in the bead, they retain all their geometrical features.

As a variant, the inserts may be obtained by thermoplastic injection molding.

The housing 221 is obtained by machining the lining body, for example by spark machining.

As a variant, the housing 221 is obtained directly by molding.

The body of the insert 10, according to a first embodiment, may be fastened, by adhesive bonding, to said housing 221.

It is also possible to embed the body of the insert into the foundry material, generally aluminum, during one of the steps of manufacturing the molding lining portion, without it being necessary to use sophisticated means for preventing the penetration of aluminum into the notch.

The insert represented in FIG. 1 also comprises means for discharging the air likely to be trapped in the slot during the molding of the flexible wall. These means are formed by vents of cylindrical shape 103 that pass through the body of the insert and connect the base of the slot to the lower wall of the insert opposite the wall on which the slot 100 opens.

The insert 10 is here represented all in one piece.

As a variant, the insert 10 may be formed from several parts previously assembled before the insertion of said insert 10 into the housing 21. The insert 10 may be formed, for example, of 2 or 3 parts. It is thus possible to more easily apply a particular product to zones of the insert forming the slot 100, such as a non-stick agent that facilitates the demolding of a flexible wall molded by said slot 100.

The non-stick agent may be, for example, Xylan.

The second embodiment of the invention illustrated in FIG. 2 and in FIGS. 2a, 2b and 2c represents an insert 11 that also comprises a head 111 and a body 112.

The head of the insert 11 comprises a recess 110 made on one of the lateral faces of the insert perpendicular to the direction XX'. This recess extends in the direction ZZ' over a height h, and has a width f corresponding substantially to the thickness of the flexible wall that it is desired to produce.

The recess 110 is bordered, on two sides of the walls of the head that are perpendicular to the transverse direction, by partitions 115 and 116 having a thickness e.

The body 112 of the insert comprises a perforation 113 intended to receive an element for fastening the insert to the lining, such as for example a screw.

The recess 110 cooperates with the wall of the housing located level with the bead and placed opposite the head of the insert so as to form a slot that makes it possible to mold the flexible wall.

To facilitate the assembling and disassembling operations, said housings may usefully be arranged in one of the outer lateral faces of the lining element, as is illustrated in FIG. 6.

The lining element 2 represented in FIG. 6 comprises a base 21 comprising beads 210. The bead 210 is interrupted at one of the longitudinal edges of the lining element so as to allow the insertion of the body of an insert 11 according to the second embodiment of the invention.

The insert is positioned so that the recess 110 is placed opposite the end wall 210a of the bead so that, when the insert is fastened, using a fastening element, to the wall of the bead, the recess 110 and the wall 210a of the bead delimit the shape of a slot 1 of height h, of width, f and that is limited by the lateral partitions 115 and 116.

As has already been stated, this embodiment has an additional advantage relative to the first embodiment. Specifically, it is seen, during the repeated use of the lining element for producing tires, that there is a tendency for curing residues to become attached to the notch and for the notch to become gradually obstructed. It is then possible to separate the lining elements from the mold and to detach the inserts 11 so as to carry out the cleaning operation by simple brushing of the surface of the recess 110 and of the end wall 210a of the bead of the lining element.

In order to discharge the air trapped in the notch during molding of the flexible wall using an insert 11 according to this second embodiment, it is possible to carry out slight boring, to a depth $\epsilon$, on the central part of the wall 117 of the body of the insert in which the recess is produced and that is placed opposite the wall 210a of the bead, so that the contact with said wall of the bead is ensured by the transversely opposite lateral parts of the wall 117. The value $\epsilon$ of the boring may usefully be between 0.03 mm and 0.1 mm.

It will be observed that an insert according to this second embodiment may comprise a recess on each of its two walls perpendicular to the longitudinal direction so that one recess cooperates with the transverse wall 210a of the bead of the lining element to which said insert is fastened, and that the recess positioned on the other side of the insert cooperates with the wall of the bead of the circumferentially adjacent lining element.

It will also be noted that the housing 211 and the transverse wall 210 are obtained by machining the lining element 21, for example by spark machining.

In one embodiment variant, the housing 211 and the transverse wall 210 are obtained directly by molding.

The insert 12 illustrated in FIG. 3 is an embodiment variant of the insert 11. It was observed that the operation of boring the face 117 of the body of the insert for the purpose of making a vent is complex due to the reduced size of the insert. Thus, it was proposed to produce the recess 120 over the entire height of the face of the insert, and to position an intermediate part 123, also known as foil 123, having a thickness (f-ϵ), on the wall of the body of the insert.

The recess of use in molding of the flexible wall is then delimited by the edge of the foil, and by the partitions 125 and 126 having a thickness e.

Similarly, to the insert 11 according to the second embodiment, the body of the insert 12 and of the foil 123 also comprise a perforation 113 that makes it possible to introduce a fastening element.

The insert illustrated in FIG. 3 is positioned so that the recess 120 is placed opposite the end wall 210a of the bead. Thus, when the insert is fastened to the wall of the bead, the recess 120 and the wall 210a of the bead delimit the shape of a slot having a height h, and a width f, said slot being limited by the partitions 125 and 126.

In one embodiment variant, it is possible to provide an additional plate leaning on the partitions 125 and 126 with a view to delimiting the slot, instead of the wall 210a of the bead. It is then possible to use the insert from this particular embodiment in a housing 221 provided in the body of the lining element, as illustrated in FIG. 5.

By way of example, FIG. 4 represents, as a top view, positioning variants of the recess that make it possible to obtain particular arrangements of the flexible wall.

The insert 13 illustrated in FIG. 4a comprises two half-recesses 131 and 132, positioned on each of the faces perpendicular to the longitudinal direction XX', and placed transversely on opposite sides of said faces.

The insert 14 illustrated in FIG. 4b comprises two recesses 140 and 141, positioned on each of the faces perpendicular to the longitudinal direction XX'.

FIG. 4c illustrates the case of an insert comprising two half-recesses 150 and 151 positioned on one and the same face and separated by a partition 152.

In embodiment variants, it is possible to combine the various teachings from the present description so as to mold forms having flexible walls suitable for various configurations such as that illustrated in FIG. 5, but also to adapt the choice of the insert to the embodiment of the molding lining.

The insert 10, 11, 12, 13, 14, 15 is here formed from a metallic material, such as steel.

In one embodiment variant, the insert 10, 11, 12, 13, 14, 15 comprises a non-stick material such as polyether ether ketone in view of facilitating the molding and demolding of a flexible wall molded by said insert.

In another embodiment variant, the insert 10, 11, 12, 13, 14, 15 comprises polytetrafluoroethylene (PTFE) to facilitate the molding and demolding of the flexible wall.

The invention claimed is:

1. A tire curing mold comprising at least one lining element for molding the tread of a tire, said lining element comprising at least one bead for molding a groove in the tread, wherein:
    the curing mold comprises at least one insert forming a portion of the bead, said insert partially or completely delimiting a slot extending into the depth of the bead;
    the slot is oriented substantially perpendicularly to the bead;
    the slot is configured in order to mold a flexible wall of reduced dimension relative to a corresponding dimension of the groove in the tread made as one piece with at least one wall of the groove molded by the bead.

2. The curing mold according to claim 1, wherein the slot is configured in order to mold a flexible wall made as one piece with the bottom of the groove.

3. The curing mold according to claim 1, wherein the width (f) of the slot is between 0.2 and 1 mm.

4. The curing mold according to claim 1, wherein the insert is removably positioned in a housing made in the lining element.

5. The curing mold according to claim 1, wherein the slot is delimited by the insert and an end wall of the bead.

6. The curing mold according to claim 1, wherein the bead comprises at least one vent opening into the slot for venting air.

7. The curing mold according to claim 6, wherein the vent is of cylindrical shape.

8. The curing mold according to claim 6, wherein the vent is delimited by a wall of the insert and an end wall of the bead.

9. The curing mold according to claim 6, wherein the insert comprises a main body and an intermediate part positioned in said main body, the vent being delimited by said intermediate part and an end wall of the bead.

10. The curing mold according to claim 9, wherein the intermediate part has a thickness (f-ϵ) that is smaller than the width (f) of the slot.

* * * * *